(12) United States Patent
Lim et al.

(10) Patent No.: US 11,546,101 B2
(45) Date of Patent: Jan. 3, 2023

(54) CLOUD-BASED WI-FI NETWORK SYSTEM USING IMMEDIATE ACK IN UPLINK DATA TRANSMISSION

(71) Applicant: GWANGJU INSTITUTE OF SCIENCE AND TECHNOLOGY, Gwangju (KR)

(72) Inventors: Hyuk Lim, Gwangju (KR); Gyung Min Kim, Gwangju (KR); Yong Gang Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 826 days.

(21) Appl. No.: 16/526,869

(22) Filed: Jul. 30, 2019

(65) Prior Publication Data
US 2020/0036488 A1 Jan. 30, 2020

(51) Int. Cl.
*H04L 5/00* (2006.01)
*H04W 72/04* (2009.01)
(Continued)

(52) U.S. Cl.
CPC .......... *H04L 5/0032* (2013.01); *H04L 5/0055* (2013.01); *H04W 72/0433* (2013.01); *H04W 72/082* (2013.01); *H04W 84/12* (2013.01)

(58) Field of Classification Search
CPC ............... H04L 5/0032; H04L 5/0055; H04W 72/0433; H04W 72/082; H04W 84/12
(Continued)

(56) References Cited

U.S. PATENT DOCUMENTS

| 2004/0166887 A1* | 8/2004 | Laroia | H04B 7/0491 |
| | | | 455/69 |
| 2013/0176864 A1* | 7/2013 | Quan | H04L 1/0028 |
| | | | 370/252 |
| 2016/0135184 A1* | 5/2016 | Zavadsky | H04B 7/04 |
| | | | 370/329 |

FOREIGN PATENT DOCUMENTS

| KR | 100801000 B1 | 7/2007 |
| KR | 20140116225 A | 10/2014 |
| KR | 101660797 B1 | 9/2016 |

OTHER PUBLICATIONS

Kim et al., "Cloud-Based Wi-Fi Network Using Immediate ACK in Uplink Data Transmissions" in IEEE Access, vol. 6, pp. 2169-3536, Jul. 3, 2018. (10 pages).
(Continued)

*Primary Examiner* — Chi Tang P Cheng
(74) *Attorney, Agent, or Firm* — Loza & Loza, LLP; Heidi Eisenhut

(57) ABSTRACT

A cloud-based Wi-Fi network architecture consisting of a CU and RAUs is proposed as an improvement on the conventional Wi-Fi architecture with traditional access points (APs). In addition, a method for uplink data transmission in a cloud-based Wi-Fi network is proposed. In a conventional Wi-Fi network with independently operating APs, APs close to each other may not be able to utilize the same frequency band efficiently because of significant amounts of interference. However, in a cloud-based Wi-Fi network, the CU coordinates RAUs so that they can operate in the same frequency band by transmitting or receiving signals through the shared wireless medium to improve spectral efficiency. For each frequency band, the proposed system utilizes a diversity combining that combines multiple signals and introduces a single improved signal with high signal-to-noise ratio for uplink transmission in the cloud-
(Continued)

based Wi-Fi network. In proposed uplink transmission method for a cloud-based Wi-Fi network, diversity combining is utilized with the immediate acknowledgement (ACK) transmission method that transmits the ACK frame to the client immediately before decoding. The proposed uplink data transmission method mitigates the performance degradation caused by the fronthaul propagation delay between the CU and RAUs, without significant modification of the IEEE 802.11 standard.

12 Claims, 7 Drawing Sheets

(51) Int. Cl.
*H04W 72/08* (2009.01)
*H04W 84/12* (2009.01)

(58) Field of Classification Search
USPC ........................................................ 370/329
See application file for complete search history.

(56) References Cited

OTHER PUBLICATIONS

Chang et al., "Architecture and Applications of a Versatile Small-Cell, Multi-Service Cloud Radio Access Network Using Radio-over-Fiber Technologies," in IEEE International Conference on Communications (ICC), Jun. 2013. (5 pages).

Pompili et al., "Elastic Resource Utilization Framework for High Capacity and Energy Efficiency in Cloud RAN," IEEE Communications Magazine, vol. 54, No. 1, pp. 26-32, Jan. 2016. (7 pages).

Lei et al., "A Semi-Matching Based Load Balancing Scheme for Dense IEEE 802.11 WLANs," IEEE Access, vol. 5, pp. 15332-15339, Jul. 28, 2017. (8 pages).

Seyedebrahimi et al., "Fine-Grained Radio Resource Management to Control Interference in Dense Wi-Fi Networks," in IEEE Wireless Communications and Networking Conference (WCNC), Mar. 2017. (6 pages).

Deronne et al., "Analysis of the MAC Performances in 802.11g Radio-over-Fiber Systems," in IEEE Symposium on Communications and Vehicular Technolog (SCVT), Nov. 2011. (5 pages).

Deronne et al., "WiFi Transmission in Radio-over-Fiber Systems: Performance of the IEEE 802.11n Aggregation Mechanism," in International Conference on Optical Network Design and Modeling (ONDM), Brest, France, Apr. 2013. (6 pages).

* cited by examiner

CLOUD-BASED WI-FI NETWORK SYSTEM USING IMMEDIATE ACK IN UPLINK DATA TRANSMISSION

CROSS-REFERENCE TO RELATED APPLICATIONS

The present application claims priority under 35 U.S.C. 119 and 35 U.S.C. 365 to Korean Patent Application No. 10-2018-0075034, filed on Jun. 28, 2018 and Korean Patent Application No. 10-2018-0088845, filed on Jul. 30, 2018, which is hereby incorporated by reference in its entirety.

BACKGROUND

The present disclosure relates to a centralized or cloud-based radio access network system. Specifically, the present disclosure relates to a cloud-based Wi-Fi network system.

A centralized or cloud-based radio access network is a new type of next generation communication network technology constituted by a remote radio heads (RRHs) equipped with radio-frequency (RF) modules located at the ends of the network and a central unit (CU) in the cloud coordinates network traffic, manages network resources, and performs signal processing. The central processing at the CU facilitates efficient communication resource management to improve wireless connectivity performance by globally controlling communication resources of RRHs such as RF or transmission power allocation.

Since most operations for providing data services including baseband signal processing or wireless medium access control (MAC) are performed at the CU in the cloud, service maintenance and updating new communication protocols of a cloud-based network are easier than those of the conventional decentralized network. Due to these advantages, much recent research has focused on centralized or cloud-based radio access network architecture and related methods for resource management in wireless networks. (Non-Patent Literatures 1 and 2)

CITATION LIST

Non-Patent Literature (Non-Patent Literature 1) [1] G.-K. Chang, C. Liu, and L. Zhang, "Architecture and applications of a versatile small-cell, multi-service cloud radio access network using radio-over-fiber technologies," in IEEE International Conference on Communications (ICC), June 2013.
(Non-Patent Literature 2) [2] D. Pompili, A. Hajisami, and T. X. Tran, "Elastic resource utilization framework for high capacity and energy efficiency in cloud RAN," IEEE Communications Magazine, vol. 54, no. 1, pp. 26??32, 2016.
(Non-Patent Literature 3) [3] T. Lei, X. Wen, Z. Lu, and Y. Li, "A semi-matching based load balancing scheme for desne IEEE 802.11 WLANs," IEEE Access, vol. 5, pp. 15332-15339, 2017.
(Non-Patent Literature 4) [4] M. Seyedebrahimi, F. Bouhafs, A. Raschella, M. Mackay, and Q. Shi, "Fine-grained radio resource management to control interference in dense Wi-Fi networks," in IEEE Wireless Communications and Networking Conference (WCNC), March 2017.
(Non-Patent Literature 5) [5] S. Deronne, V. Moeyaert, and S. Bette, "Analysis of the MAC performances in 802.11g radio-over-fiber systems," in IEEE Symposium on Communications and Vehicular Technolog (SCVT), November 2011.
(Non-Patent Literature 6) [6] S. Deronne, V. Moeyaert, and S. Bette, "WiFi transmission in radio-over-fiber systems: Performance of the IEEE 802.11n aggregation mechanism," in International Conference on Optical Network Design and Modeling (ONDM), April 2013.

SUMMARY

The present disclosure aims to solve a problem of propagation delay between CU and APs that is not considered in a cloud-based Wi-Fi network. The present disclosure also aims to improve Wi-Fi performance through baseband-signal-level cooperative diversity combining using multiple APs, which has not been possible in an existing decentralized network.

In one embodiment, a cloud-based Wi-Fi network system may include: at least one remote access unit configured to receive a header of a signal from at least one client and transmit a report message based on a data signal header to a central unit; and the central unit configured to determine one or more remote access units to transmit data from the client to the central unit based on the report message obtained from the remote access unit and transmit a response message to a first remote access unit based on the determination, wherein the response message may include an immediate ACK message, the first remote access unit may transmit an immediate ACK message to a first client based on the immediate ACK message, and at least one remote access unit may transmit data received from the first client to the central unit.

The central unit may collect report messages from one or more remote access units during a waiting period and select a remote access unit to transmit data to the central unit in order for diversity combining based on a report message during a selection period.

The header of the signal may include at least one of a modulation and coding scheme or data length information.

The central unit may select one or more remote access units based on a signal-to-noise ratio (SNR) level and information included in the header of the signal.

The central unit may select the one or more remote access units by calculating a probability of decoding the received data based on the SNR level and the information included in the header of the signal.

When the SNR level is low and it is predicted that correct decoding of signal is not possible, the central unit may not select the one or more remote access units.

The central unit may be connected to the plurality of remote access units by a fronthaul and may select the one or more remote access units by increasing the number of remote access units until a fronthaul capacity limitation condition is satisfied.

When the SNR level is low and it is predicted that correct decoding signal is not possible, the response message may not include the immediate ACK message.

If the multiple remote access units transmit data received from the client according to the response message, the central unit performs diversity combining so that data received from multiple RAUs near the client are combined into a single improved signal.

The central unit may determine a set of remote access units capable of transmitting and receiving the report message and the response message before data transmission is completed in the first client.

The central unit may transmit the response message to the one or more remote access units before the data transmission is completed in the first client.

The central unit may perform signal processing including decoding of data received from the remote access unit and transmit the immediate ACK message to the first remote access unit before the data decoding is completed.

The central unit may transmit the response message to the determined one or more remote access units.

The central unit may designate the first remote access unit among the one or more remote access units as a node that transmits the immediate ACK message to the client, and may transmit a response message including the immediate ACK message to the first remote access unit.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present disclosure will be described in detail with reference to the accompanying drawings. It should be understood, however, that there is no intention to limit the invention to the embodiments described below, and that those skilled in the art, who understands the spirit of the present disclosure, can readily suggest other embodiments included within the scope of the same concept by adding, changing, deleting, and adding elements, but they are also included within the scope of the present disclosure.

The accompanying drawings are merely exemplary and are not to be construed as limiting the present disclosure. The present disclosure may, however, be embodied in many different forms and should not be construed as limited to the embodiments set forth herein. Furthermore, even if specific parts such as installation positions are different, the same names are given when the functions are the same, so that the convenience of understanding can be improved. When there are a plurality of identical configurations, only one configuration will be described, and the same description will be applied to the other configurations, and a description thereof will be omitted.

Although the cloud-based network architecture described above has many advantages and potentials, applying central network architecture to the Wi-Fi networks has not been much focused. That is, a Wi-Fi network is a public network that can be established by anyone who connects the legitimate access points (APs) to the Internet, and thus, backward compatibility of protocols for a cloud-based Wi-Fi network is highly necessary. Moreover, short communication range of a Wi-Fi service requires tighter time-out bound of message transmissions compared to the cellular network with large coverage.

However, as many APs for a Wi-Fi network are deployed densely to support high traffic demand, coordination and resource management of the APs become an important way to improve wireless service performance (Non-Patent Literature 3). APs in conventional Wi-Fi networks provide wireless connectivity services independently of each other using the same industrial, scientific, and medical (ISM) radio bands. Hence, in a Wi-Fi network with densely deployed APs, interference from other APs or clients connected to them can significantly degrade the signal-to-noise ratio (SNR). The transmitted data is unlikely to be decoded successfully with a degraded SNR. Therefore, in a large area with densely deployed APs, the central processing that controls the communication resources of APs such as RF or power allocation in order to mitigate interference is important (Non-Patent Literature 4).

Figure 1:
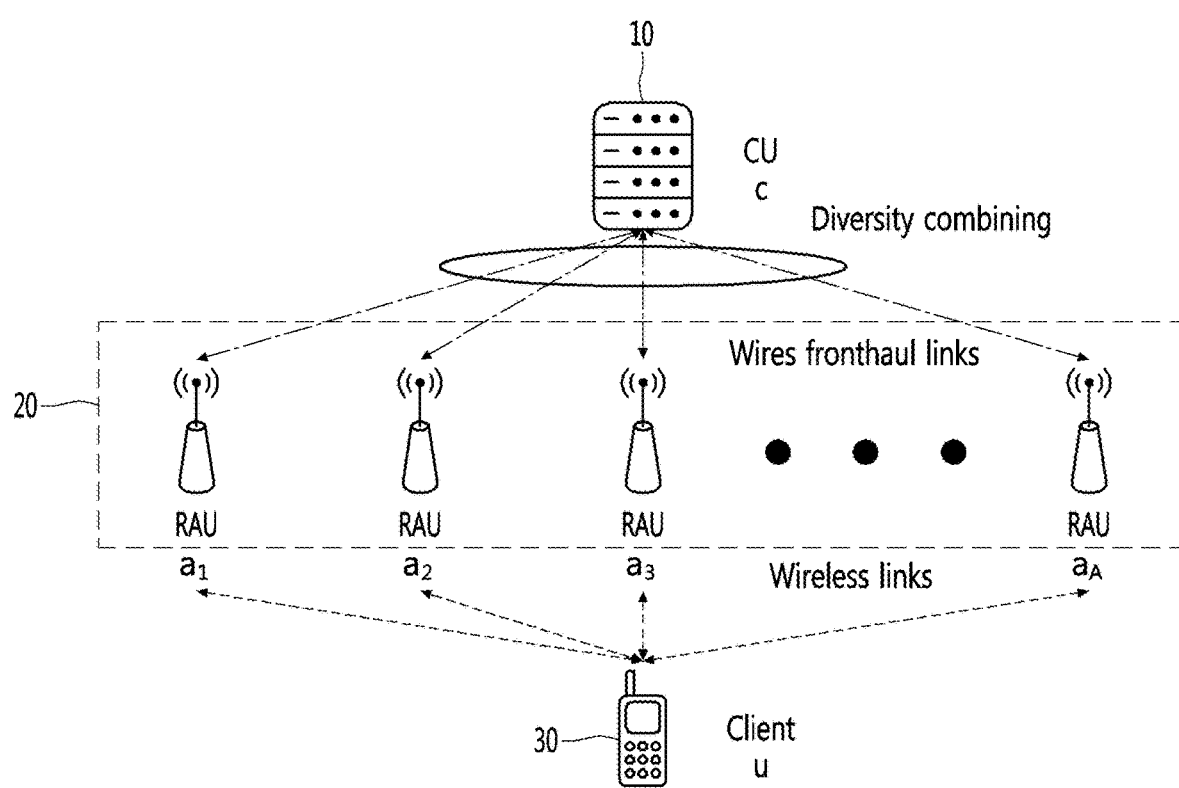
FIG. 1 illustrates a cloud-based WiFi network in a single channel.

FIG. 1 illustrates a cloud-based WiFi network in a single channel.

As illustrated in FIG. 1, the cloud-based Wi-Fi network includes a central unit (CU) 10, at least one remote access unit (RAU) 20, and a client 30.

As illustrated in FIG. 1, the CU 10 and the RAU 20 may be connected via a wired fronthaul. The RAU 20 and the client may be connected by wireless.

The CU 10 may receives a report message from the RAU 20, and generate and transmit a response (control) message corresponding thereto. The RAU 20 may operate as an access point (AP) to relay data between at least one client and a wired device. The client is a wireless device, for example, a mobile device, a smart home appliance, a connected car, and a configuration thereof.

The CU 10 provides functions for providing a data service to the client, collects information from the RAU 20, and controls and manages the RAU 20 by using the information. The RAU 20 is equipped with an RF module and is directly connected to the client by wireless to relay data transmission and reception between wired/wireless devices.

The present disclosure proposes a cloud-based Wi-Fi network architecture including the cloud-based CU 10 and the RAU with the RF module. In addition, the present disclosure proposes a method for transmitting uplink data in a cloud-based Wi-Fi network.

Most of the operations for providing the wireless access service in the proposed centralized Wi-Fi network are processed by the CU 10. The CU 10 performs control such that the plurality of RAUs 20 close within each single channel cooperatively receive signals so as to improve uplink throughput performance.

The CU 10 may use the plurality of RAUs 20 as receivers for receiving signals from the same client. The signals from the plurality of RAUs 20 may be combined into one signal having a high SNR through a diversity combining technique. The method and system proposed in the present disclosure may provide a reliable connection service having a high data transmission rate in a cloud-based Wi-Fi network.

An uplink data transmission method according to an embodiment may solve a long propagation delay time between a CU and an RAU which are problematic in applying a cloud-based network architecture to a Wi-Fi network. Unlike APs in the existing Wi-Fi network, the CU in the cloud-based Wi-Fi network is not directly connected to clients at network edges. Therefore, since an additional propagation delay time occurs between the CU and the RAU, the existing IEEE 802.11 standard can not be used as it is.

In the IEEE 802.11 protocol, a receiver notifies a transmitter of successful signal reception by transmitting an acknowledgement (ACK) frame. Although the CU tries to transmit an ACK frame after decoding received data, the ACK frame might not be transmitted to the client in the given time-out duration because of a long propagation delay between the CU and RAU.

In order to overcome this problem, many studies have focused on modifying the time parameters of the IEEE 802.11 protocol such as slot time or time-out duration. Nevertheless, increasing the slot time or time-out duration to accommodate the propagation delay in a cloud-based network may fundamentally degrade throughput performance owing to the time overhead. Unlike the previous work, the proposed method does not increase time overhead, but transmits an ACK frame before decoding the received data if successful decoding is expected. Thereby, the proposed method mitigates the performance degradation caused by a long propagation delay while maintaining backward-compatibility with the IEEE 802.11 protocol in terms of time.

The present disclosure proposes a cloud-based Wi-Fi network architecture consisting of CU and RAUs. Unlike the conventional Wi-Fi network with independently operating APs, in the proposed cloud-based Wi-Fi network, the CU globally controls communication resources and coordinates multiple RAUs to improve throughput performance.

In the present disclosure, a diversity combining-based uplink method is proposed to increase the probability of successful signal decoding in a cloud-based Wi-Fi network. Unlike the conventional Wi-Fi networks, in which APs perform baseband signal processing independently, the proposed method performs baseband-signal-level cooperative diversity combining using multiple RAUs and provides highly reliable connectivity services.

In the present disclosure, the CU may preemptively transmit the ACK frame before all client data is decoded, thereby alleviating the propagation delay problem between the CU and the RAU.

The CU 10 according to the embodiment performs most of signal processing including decoding. As illustrated in FIG. 1, the CU 10 controls the RAUs that are connected via wired fronthaul links. u is the client 30 to transmit uplink data, A={$a_1, a_2, \ldots, a_A$} Is the RAU 20 in the communication range of the client 30, and c is the CU 10 that controls the RAU in the Wi-Fi network. The signal received by each RAU ($a_1$, $i \subset \{1, 2, \ldots, A\}$) is expressed as Equation 1.

$$y_{a_i} = h_{u,a_i}\sqrt{p_u}x_u + z_{a_i},\quad \text{[Equation 1]}$$

$h_{u,ai}$ is a channel coefficient from the client 30 to the RAU 20, $P_U$ Is transmission power of the client, $x_u$ is the transmitted symbol, $Z_{ai}$ Is an addictive white Gaussian noise (AWGN) having a variance $\sigma^2$ for the RAU. By using Equation 1, an SNR $\gamma^{ai}$ at $a_i$ is expressed as Equation 2.

$$\gamma_{a_i} = \frac{p_u|h_{u,a_i}|^2}{\sigma^2}. \quad \text{[Equation 2]}$$

In the network, the RAU 20 transmits the received data to the CU 10 in order for diversity combining, and the propagation delay of the wired fronthaul link between the CU 10 and the RAU 20 is expressed by $\tau_{a_i,c}^{PRO}$. After the RAU 20 transmits the received data to the CU 10, the CU 10 applies the diversity combining. Maximal-ratio combining (MRC) in which data from the plurality of RAUs 20 are weighted and combined according to their SNR levels is used. When S is the set of RAUs for MRC among all the RAUs, the instantaneous SNR per bit at the output of the MRC diversity receiver is expressed by Equation 3.

$$\gamma_S = \sum_{a_i \in S} \gamma_{a_i}. \quad \text{[Equation 3]}$$

By combining multiple signals from the RAUs in S using MRC, the CU yields a single improved signal, which increases the probability of successfully decoding the uplink data.

Figure 2:
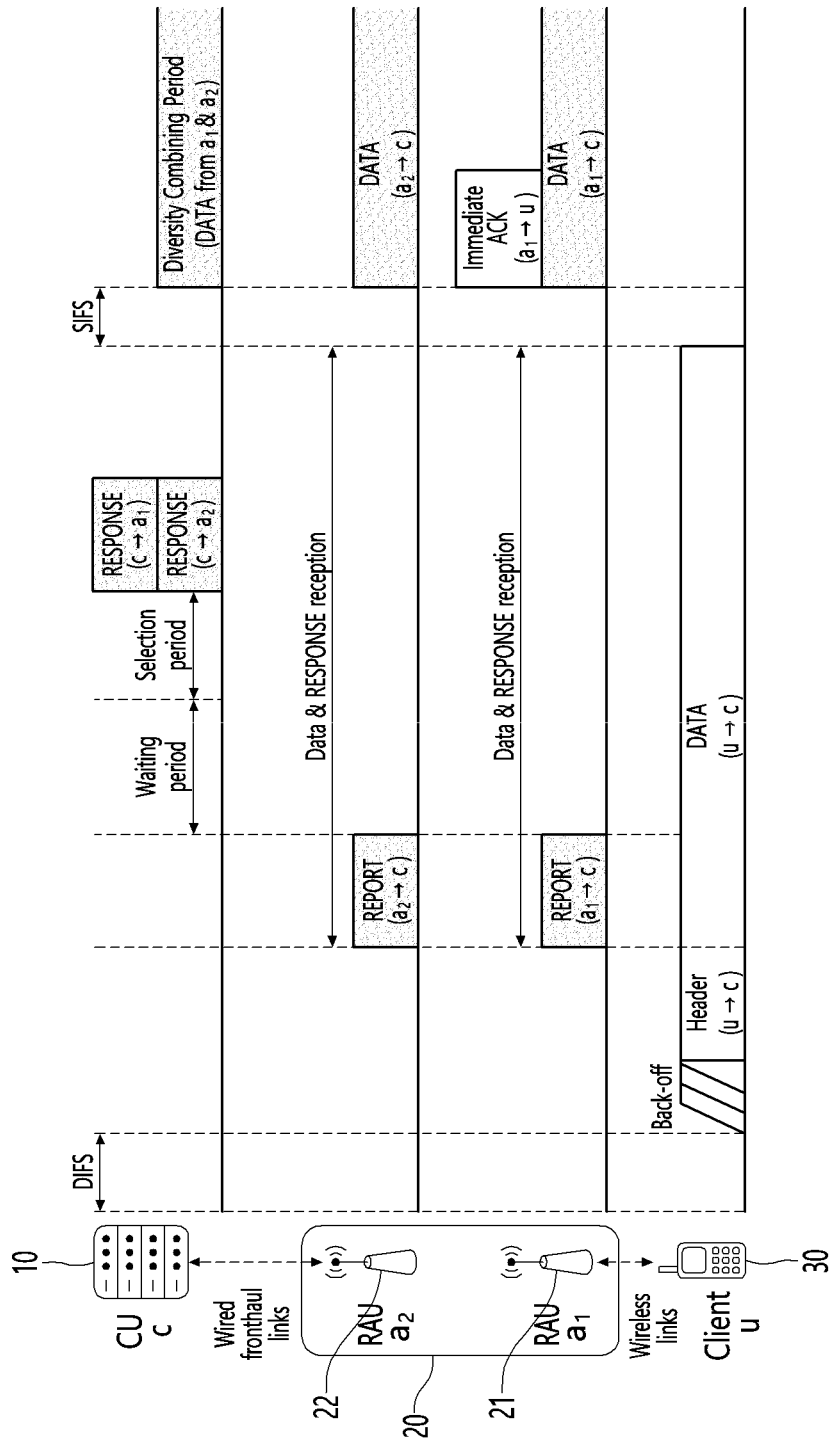
FIG. 2 illustrates an immediate ACK-supported cloud-based Wi-Fi MAC protocol.

FIG. 2 illustrates an immediate ACK-supported cloud-based Wi-Fi MAC protocol.

FIG. 2 illustrates an example in which two RAUS are used. Wired and wireless transmissions are illustrated in gray and white boxes, respectively.

In a cloud-based Wi-Fi network, the throughput performance is significantly affected by the propagation delay between the RAUs and the CU. Although centralized baseband signal processing improves computational efficiency and makes coordination of multiple RAUs easy, long propagation delays between the RAUs and the CU degrade system performance. One solution is to increase the time parameters, such as slot time or ACK time-out defined in the IEEE 802.11 standards, but this also degrades throughput performance by increasing time overhead. Instead, the CU can immediately transmit an ACK frame before the received data is completely decoded to mitigate performance degradation caused by propagation delays.

However, if the probability of successful decoding is low, the immediate ACK transmission may significantly deteriorate throughput performance. A method for utilizing the plurality of RAUs near the client so as to improve throughput performance will be described with reference to FIG. 2. The CU performs diversity combining such that data received from the plurality of RAUs near the client are combined into one improved signal. If the MRC technique for diversity combining is applied, the SNR values of the RAUs may be summed as expressed in Equation 3, and the CU may improve the SNR. Due to this, improved SNR may be achieved in the cloud-based Wi-Fi network, the average bit error rate (BER) may be reduced, and throughput performance may be improved.

However, since the central calculation procedure does not apply to the previous MAC protocol for Wi-Fi networks, new Wi-Fi MAC protocols must be designed for the cloud-based Wi-Fi network. Hereinafter, the immediate ACK MAC protocol for the cloud-based Wi-Fi network will be described below with reference to FIG. 2.

As illustrated in FIG. 2, a client 30 transmits uplink data to a first RAU 21 via a wireless link, and the first RAU 21 and a second RAU 22 are connected to a CU 10 via a wired fronthaul link. An immediate ACK Wi-Fi MAC protocol procedure is as follows.

Procedure 1: The client 30, which occupies a channel after backoff, transmits a signal to the RAU. The signal transmitted in accordance with the IEEE 802.11 standard includes two parts, that is, a header and data. The header contains information about a signal such as modulation and data length. The RAU 20 receives the header of the signal transmitted from the client 30 and transmits a received I/Q sample to the CU 10. A message containing the I/Q sample transmitted from the RAU 20 to the CU 10 is referred to as a report message. As illustrated in FIG. 2, the RAUs 20 receive the header of the signal from the client 30 and transmit the report message to the CU 10.

Procedure 2: The CU 10 gathers report messages from the RAU 20 during a waiting period. Using the aggregated information of report messages, during the selection period, the CU decides which RAUs will transmit received data to the CU for diversity combining if diversity combining is required for the uplink signal from client 30. Then, the CU 10 notifies the RAUs 20 of its decision by transmitting response messages. Note that among the RAUs available for diversity combining, the CU designates one RAU as a node for transmitting the ACK message to the client and includes the ACK information in the response message to that RAU (for example, RAU 21 in FIG. 2). If unsuccessful decoding is expected due to low SNR, response does not include ACK information.

After RAU 21 receives the response message from CU 10, RAU 21 immediately transmits an ACK message (immediate ACK) to client 30, although data decoding in the CU has not yet been completed. At the same time, the RAUs designated for diversity combining begin to transmit received data to the CU. At the CU, data from multiple RAUs are aggregated and combined into a single improved signal through diversity combining. If SNR level is too low to decode data, the CU does not select any RAUs for diversity combining and no RAUs transmit data to the CU.

The propagation delay between an edge node like an RAU and the CU significantly decreases throughput performance. The proposed MAC protocol utilizes diversity combining with an immediate ACK scheme to improve the throughput performance and prevent the performance degradation caused by propagation delay between the RAU and the CU. When uplink transmission begins, the CU gathers report messages, and with this collected information, the CU determines the set of RAUs to be used for diversity combining and delivers results to the RAUs before the data transmission from the client has ended. Then, an ACK is transmitted immediately after data transmission from the clients has been completed.

Figure 3:
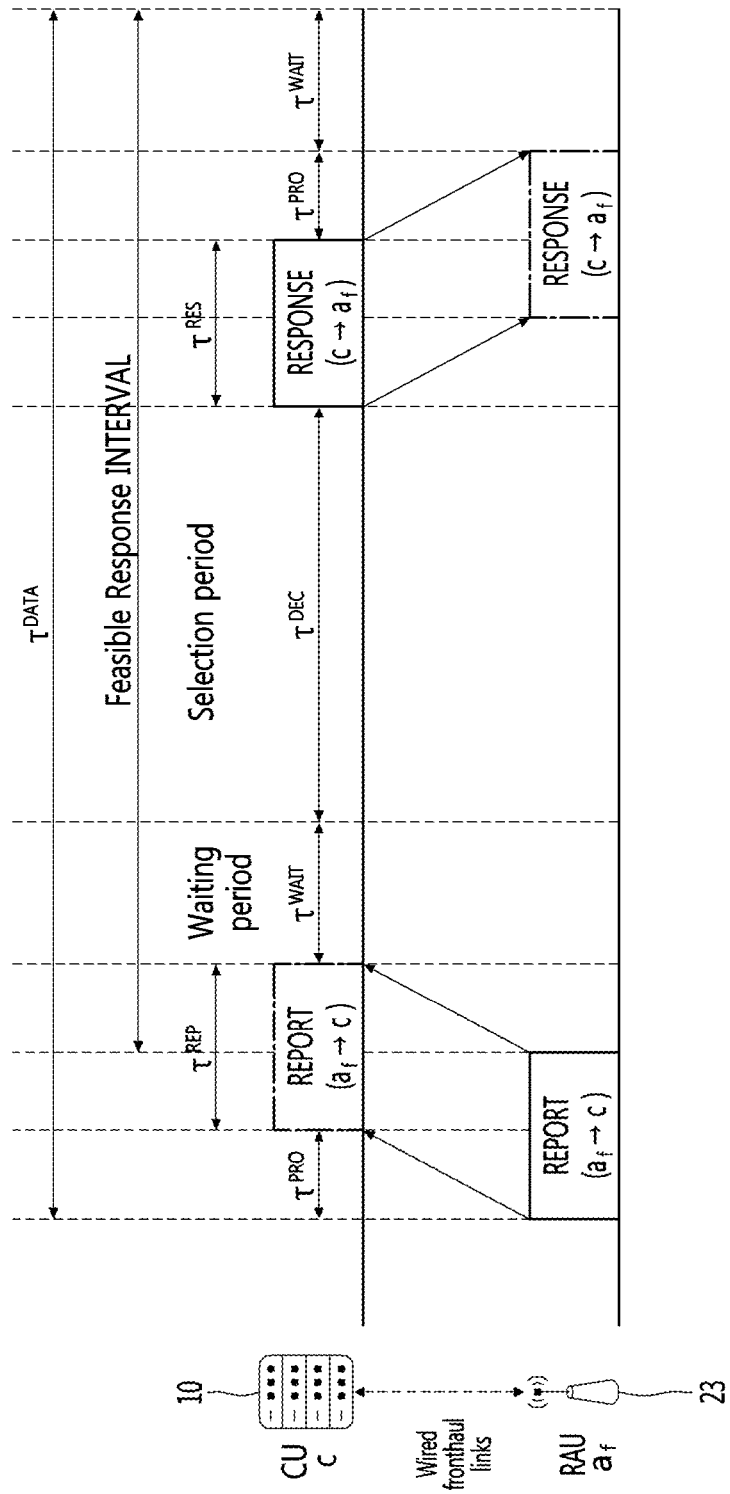
FIG. 3 illustrates a protocol that selects a remote access unit for diversity combining in an uplink transmission.

FIG. 3 illustrates a protocol that selects the RAU for diversity combining in the uplink transmission.

The process for selecting the set of RAUs for diversity combining will be described with reference to FIG. 3. As described above, the CU 10 performs diversity combining with a plurality of RAUs located at the network edge by exchanging report and response messages. In order to ensure effective diversity combining by using the plurality of RAUs in the cloud-based Wi-Fi network, the CU 10 must identify the set of RAUs that can transmit and receive report and response messages, respectively, before data transmission from the client ends.

As illustrated in FIG. 3, the CU 10 and the third RAU ($a_f$) 23 exist in the network. The third RAU ($a_f$) refers to an RAU that has transmitted a report message first arriving at the CU. The CU 10 receives a first message from the third RAU 23. When the CU 10 first receives the message from the third RAU 23, the CU 10 waits for the waiting time $\tau^{WAIT}$ so as to gather information from other RAUs that have not yet been received due to various propagation delays between the RAUs and the CU.

The report message transmission and reception times for the third RAU are denoted by $t_{a_f,c}^{REP,t_x}$ and $t_{a_f,c}^{REP,r_x}$, respectively. The propagation delay between the third RAU 23 and the CU 10 is $\tau_{a_f}^{PRO} = t_{a_f,c}^{REP,r_x} - t_{a_f,c}^{REP,t_x}$.

The duration of the report message, the duration of the response message, and the selection period are $\tau^{REP}$, $\tau^{RES}$, and $\tau^{DEC}$, respectively. The length and the rate of the uplink data from the client are $l_c^{DATA}$ and $r_c^{DATA}$, respectively. The data $\tau_{DATA}$ transmitted from the client is $\tau^{DATA} = l_c^{DATA} / r_c^{DATA}$.

When the propagation delay from a RAU to the CU and the delay from the CU to the RAU are symmetric, then the total communication delay between the RAU and the CU is calculated as expressed in Equation 4.

$$2\tau_{a_j}^{PRO} + \tau^{REP} + 2\tau^{WAIT} + \tau^{DEC} + \tau^{RES} \leq \tau^{DATA} \quad \text{[Equation 4]}$$

Based on the message from the third RAU, the maximum waiting period for collecting information from the other RAUs is expressed by Equation 5.

$$T_{max}^{WAIT} = \max\{\tau^{WAIT}\} \quad \text{[Equation 5]}$$
$$= (\tau^{DATA} - 2T_{a_f}^{PRO} - \tau^{REP} - \tau^{DEC} - \tau^{RES})/2$$

If $\tau_{max}^{WAIT} < 0$ or the waiting time is longer than $\tau_{max}^{WAIT}$, the response message does not arrive at the RAU before the transmission from the client ends. Consequently, the uplink data transmission is likely to fail since the SNR level will not be high enough to perform successful decoding. The CU must satisfy Equation 6 so as to collect the report messages from the RAUs in the communication range of the client.

$$\tau_{a_i}^{PRO} + \tau^{REP} \leq \tau_{a_f}^{PRO} + \tau^{REP} + \tau_{max}^{WAIT} \quad \text{[Equation 6]}$$

A feasible indicator function for the RAU is $I_{a_i}(l_c^{DATA}, r_c^{DATA}) = \tau_{a_f}^{PRO} + \tau_{max}^{WAIT} - \tau_{a_i}^{PRO}$. Then, the inequality in Equation 6 can be rewritten as Equation 7.

$$I_{a_i}(l_c^{DATA}, r_c^{DATA}) \geq 0 \quad \text{[Equation 7]}$$

Let $A^{DC}$ is a set of RAUs that satisfies the propagation delay constraints in Equation 7, then it is expressed as Equation 8.

$$A^{DC} = \{\{a_i\} | I_{a_i}(l_c^{DATA}, r_c^{DATA}) \geq 0, \forall a_i \in A\} \quad \text{[Equation 8]}$$

Among the RAUs in $A^{DC}$, the CU selects RAUs to participate in uplink transmission and deliver the received data from client 30 to CU 10 while ensuring that the fronthaul traffic overhead for delivering uplink data does not exceed the fronthaul capacity.

If diversity combining for uplink transmission is performed, as the number of RAUs participating in the uplink data frame transmission increases, the probability of successful decoding also increases. However, the increased number of RAUs participating in diversity combining introduces considerable traffic overhead in the fronthaul networks, because I/Q samples of large size are transmitted instead of the smaller bit streams that are obtained after baseband signal processing.

Therefore, an appropriate subset of RAUs must be selected to transmit uplink data frames to the CU for diversity combining, rather than using all the RAUs in $A^{DC}$. In the proposed method, the CU calculates the probability of decoding the received data based on SNR levels and the modulation and coding scheme (MCS) denoted in the header. Then, the CU selects the RAUs most appropriate for diversity combining while satisfying the fronthaul capacity constraint.

FIG. 4 is a graph showing a comparison of performance between the algorithm according to the embodiment and other algorithms. The average propagation delay in the fronthaul network is 5 μs and the MCS index is 12.

Figure 4A:
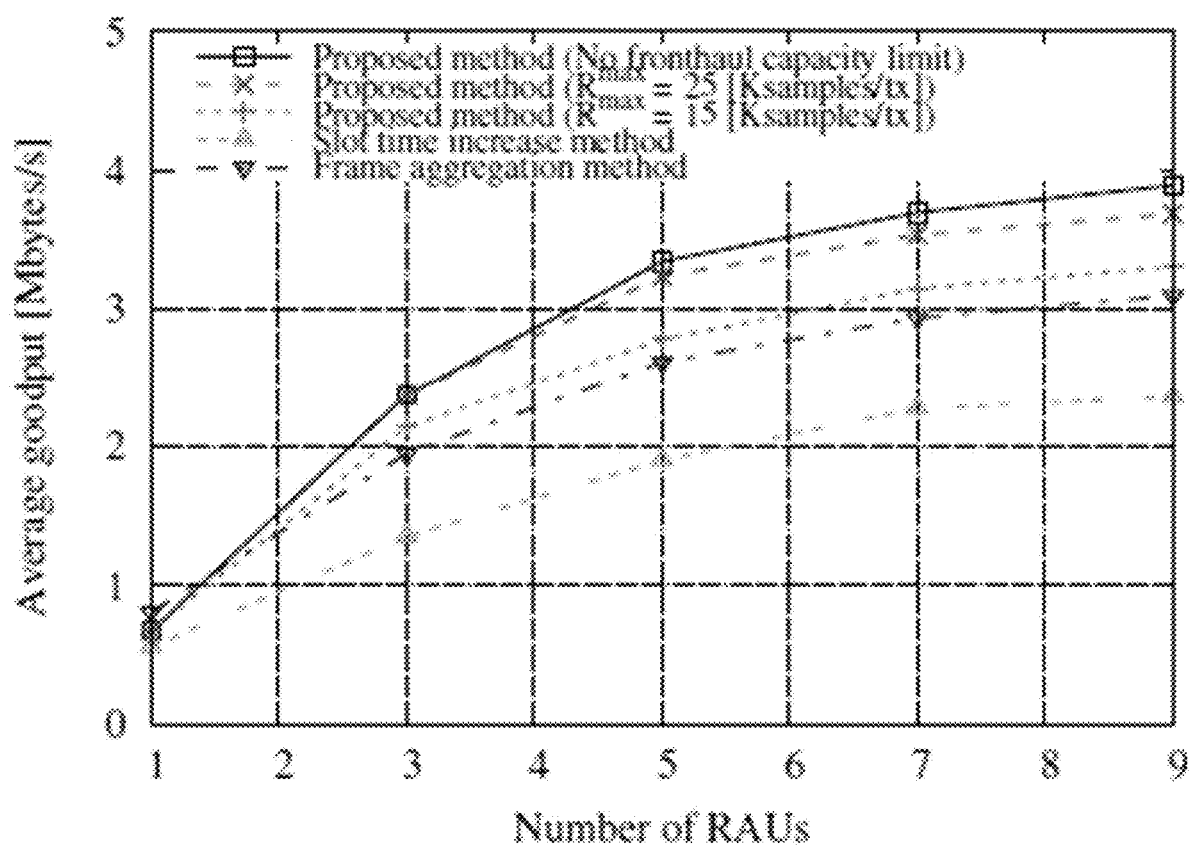
FIGS. 4A and 4B are graphs showing a comparison of performance between an algorithm according to an embodiment and other algorithms.
Figure 4B:
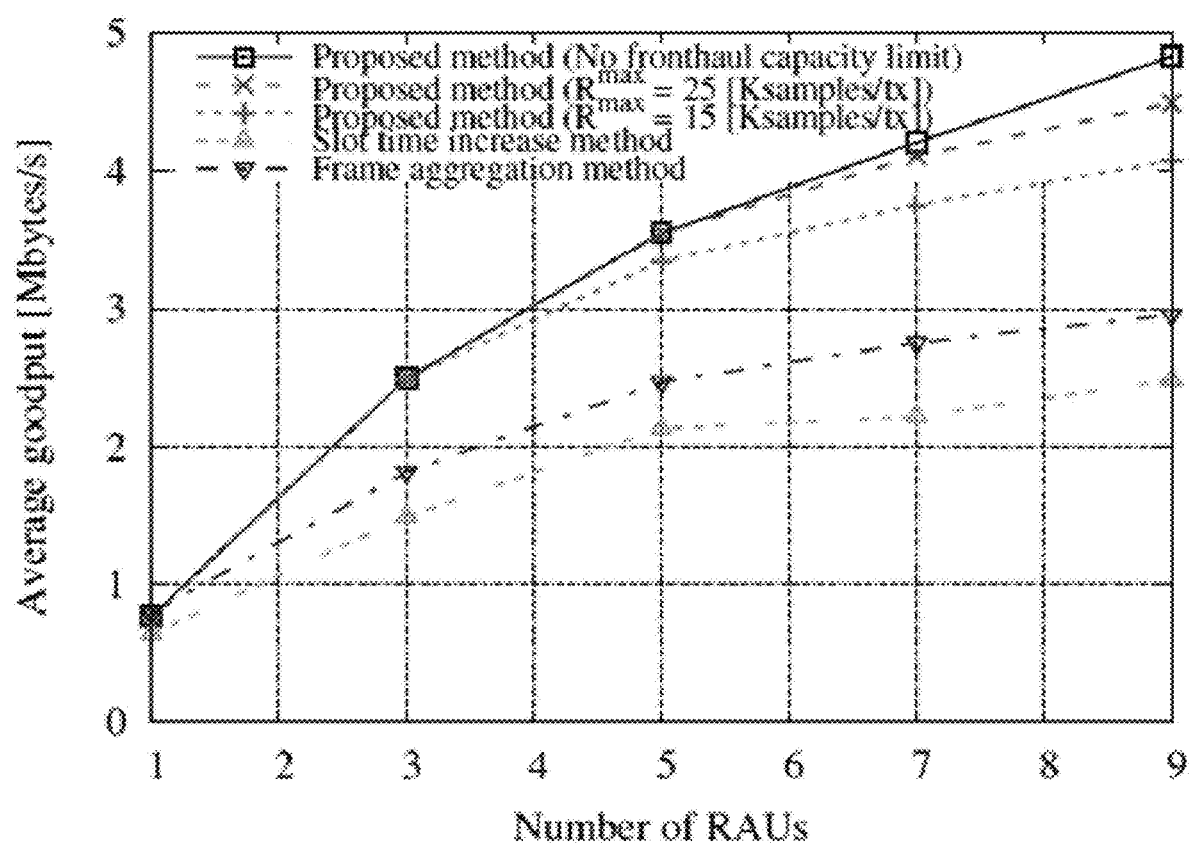

FIG. 4A illustrates the average goodput when the data length is 1,024 bytes, and FIG. 4B illustrates the average goodput when the data length is 2,048 bytes.

As illustrated in FIG. 4A, when the data length is 1,024 bytes, the proposed method shows better performance as the number of RAUs of the network increases, and shows better performance than other existing algorithms.

Since the proposed algorithm uses the plurality of RAUs located near the client for diversity combining, the proposed algorithm can improve the signal at a high SNR. As the number of RAUs for diversity combining decreases due to the limited fronthaul capacity, the goodput performance of the proposed algorithm is reduced.

FIG. 5 illustrates an average fronthaul overhead and an average packet error rate.

Figure 5A:
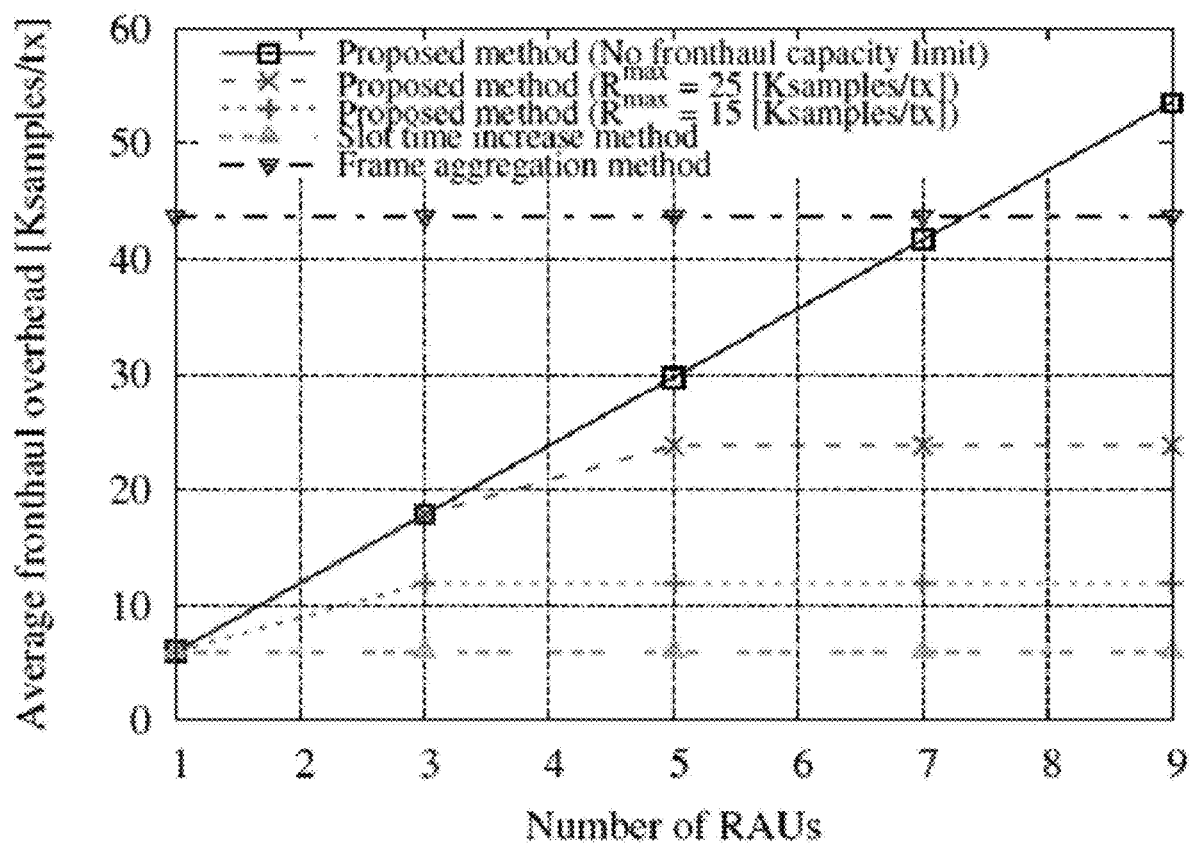
FIGS. 5A and 5B illustrate an average fronthaul overhead and an average packet error rate.

As illustrated in FIG. 5A, as the number of RAUs used for diversity combining increases, the average fronthaul overhead increases, but the fronthaul overhead in other existing algorithms is constant regardless of the number of RAUs. In the proposed algorithm, as the number of RAUs increases until the fronthaul capacity limitation condition is satisfied, more I/Q samples are transmitted through the fronthaul network. However, in the existing algorithm, only one RAU transmits a signal to the CU.

Figure 5B:
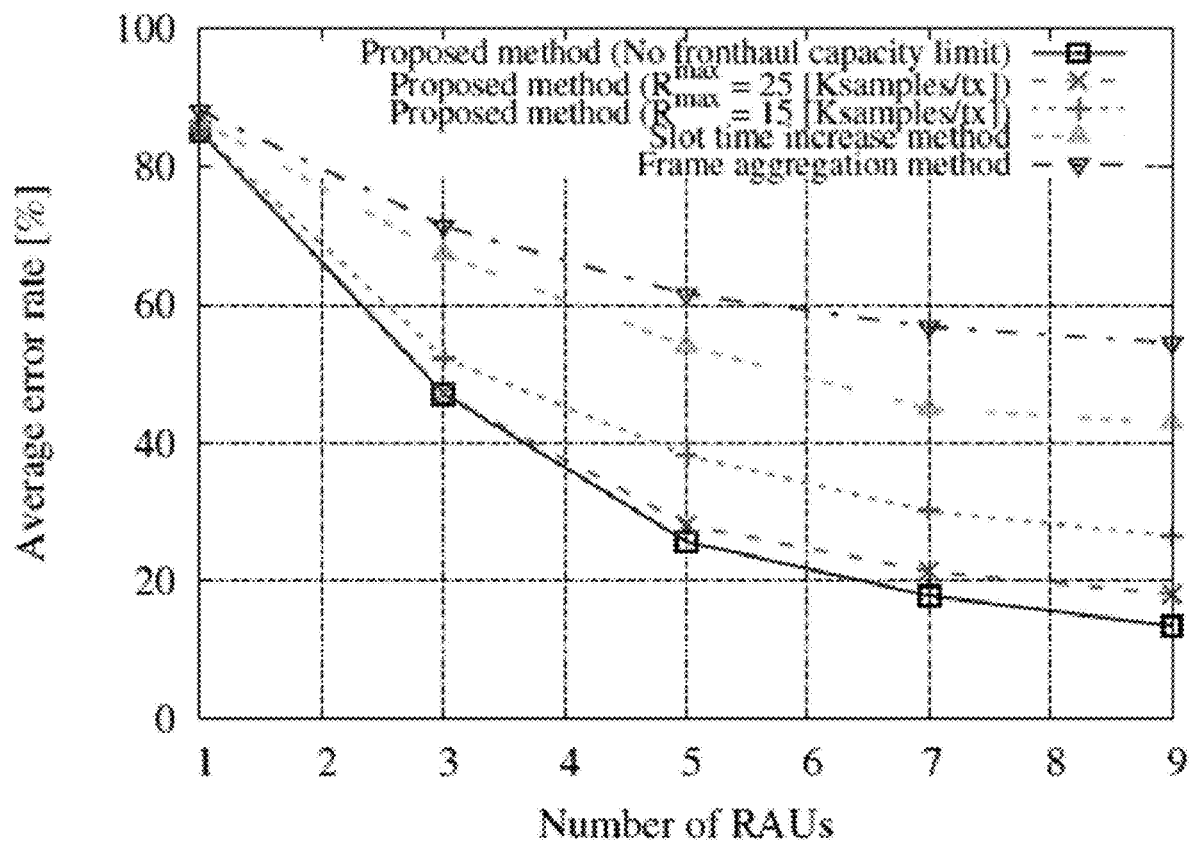

FIG. 5B shows that the packet error rate decreases in the proposed algorithm as the fronthaul capacity increases. This is because the probability of successful decoding increases when more RAUs are selected for diversity combining.

Figure 6:
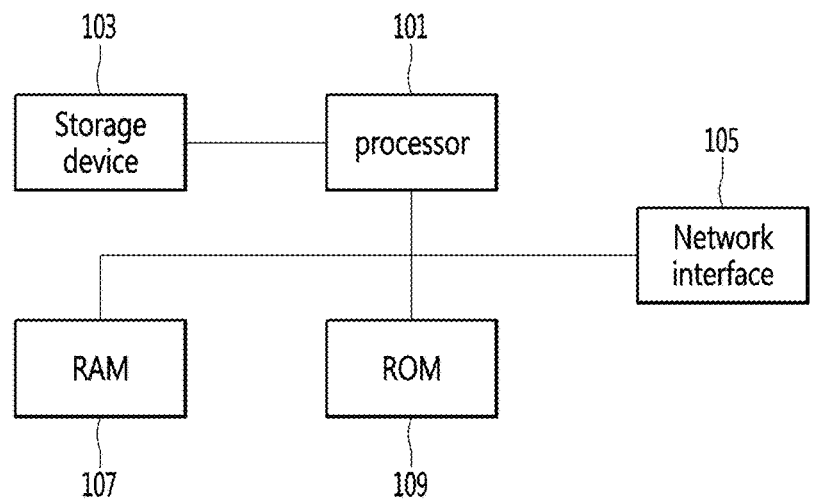
FIG. 6 is a block diagram of an exemplary computing device that may be used to implement the algorithm and technique described according to the embodiment.

FIG. 6 is a block diagram of an exemplary computing device that can be used to implement the algorithms and techniques described above according to one embodiment. The computing device may be illustrative of part of the calculation device, the RAU, or the client described above.

The computing device may include a processor 101. The processor 101 may represent a microprocessor or a controller. The computing device includes a storage device 103 that may include a single storage device or a plurality of storage devices. The storage device 103 may include a flash memory and a semiconductor memory. The computing device may include a network interface 105. The network interface 105 may include a network communication circuit such as a wired or wireless transceiver or a baseband processor.

The computing device may also include a random access memory (RAM) 107 and a read-only memory (ROM) 109. The ROM 109 may be executed in a non-volatile manner by a program or a processor. The RAM 107 may store volatile data and may store instructions related to the operation of the computing device.

The cloud-based Wi-Fi network according to the embodiment includes the CU and the RAUs, and the CU may perform cooperative communication between the RAUs at a baseband signal level, thereby improving communication performance.

In addition, in the cloud-based Wi-Fi network according to the embodiment, the CU may transmit the immediate ACK before data decoding, thereby solving the problem caused by the propagation delay between the RAUs and the CU.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. Therefore, the above description is illustrative and should not be construed as limited in all aspects. The scope of the present disclosure should be determined by rational interpretation of the appended claims, and all changes within the scope of equivalents of the present disclosure fall within the scope of the present disclosure.

What is claimed is:

1. A cloud-based Wi-Fi network system comprising:
a central unit; and
a plurality of remote access units respectively configured to:
receive a signal comprising a header and data from a client, and
transmit respective report messages, based on information included in the received header, to the central unit,
wherein the central unit is configured to:
select a set of remote access units from the plurality of remote access units to transmit the data from the client to the central unit based on the respective report messages,
perform signal processing, including decoding of the data received from the set of remote access units, and
transmit respective response messages to the set of remote access units before the transmission of the data is completed, including a first response message to a first remote access unit of the set of remote access units designating the first remote access unit as a node to transmit an immediate ACK message to the client,
wherein the first remote access unit is configured to:
transmit the data to the central unit, and
transmit the immediate ACK message to the client in response to receiving the first response message, before decoding of the data is completed.

2. The cloud-based Wi-Fi network system according to claim 1, wherein the central unit obtains the respective report messages from the plurality of remote access units during a waiting period and selects which of the plurality of remote access units are to transmit the data to the central unit in order for diversity combining based on the respective report messages during a selection period.

3. The cloud-based Wi-Fi network system according to claim 1, wherein the header of the signal includes at least one of a modulation and coding scheme or data length information.

4. The cloud-based Wi-Fi network system according to claim 1, wherein the central unit selects which of the plurality of remote access units are to transmit the data based on a signal-to-noise ratio (SNR) level and information included in the header of the signal.

5. The cloud-based Wi-Fi network system according to claim 1, wherein the central unit selects which of the plurality of remote access unit(s) is/are to transmit the data by calculating a probability of decoding the data received based on a signal-to-noise ratio (SNR) level and information included in the header of the signal.

6. The cloud-based Wi-Fi network system according to claim 1, wherein the central unit does not select the which of the plurality of remote access units are to transmit the data based on a signal-to-noise ratio (SNR) level being less than the SNR level to decode the data successfully.

7. The cloud-based Wi-Fi network system according to claim 1, wherein the central unit is connected to the plurality of remote access units by a fronthaul and selects the set of remote access units by increasing a number of remote access units until a fronthaul capacity limitation condition is satisfied.

8. The cloud-based Wi-Fi network system according to claim 1, wherein the first response message does not designate the first remote access unit as the node to transmit the immediate ACK message to the client based on a signal-to-noise ratio (SNR) level being less than the SNR level to decode the data successfully.

9. The cloud-based Wi-Fi network system according to claim 1, wherein the central unit performs diversity combining so that the data received from the set of remote access units are combined into a single improved signal.

10. The cloud-based Wi-Fi network system of claim 1, wherein the central unit is configured to designate the first remote access unit as the node to transmit the immediate ACK message from the first remote access unit, based on a first report message of the respective report messages being indicative of an expected successful decoding of the data at the central unit.

11. The cloud-based Wi-Fi network system of claim 1, wherein the set of remote access units, including the first remote access unit, is configured to complete transmitting the data to the central unit after the immediate ACK message is sent to the client.

12. The cloud-based Wi-Fi network system of claim 1, wherein the central unit is configured to abstain from designating the first remote access unit as the node to transmit the immediate ACK message to the client, based on a first report message of the respective report messages being indicative of an expected unsuccessful decoding of the data at the central unit.

* * * * *